Jan. 5, 1960 E. A. ROCKWELL 2,919,715
ACCUMULATING APPARATUS AND SYSTEM
Filed July 2, 1954 7 Sheets-Sheet 5

INVENTOR
EDWARD A. ROCKWELL.
BY
Arthur Wright
ATTORNEY

Jan. 5, 1960 E. A. ROCKWELL 2,919,715
ACCUMULATING APPARATUS AND SYSTEM
Filed July 2, 1954 7 Sheets-Sheet 6

INVENTOR
EDWARD A. ROCKWELL
BY
Arthur Wright
ATTORNEY

United States Patent Office 2,919,715
Patented Jan. 5, 1960

2,919,715

ACCUMULATING APPARATUS AND SYSTEM

Edward A. Rockwell, Los Angeles, Calif.

Application July 2, 1954, Serial No. 440,894

19 Claims. (Cl. 137—549)

My invention relates particularly to an accumulating apparatus which may be used for any desired purpose and systems in which it may be used, but which may be used, for example, in connection with power steering systems for automotive vehicles, such as automobiles, trucks, etc.

It is a general object of my invention to provide an accumulating apparatus and system of an advantageous character, which is capable of widespread use for the accumulation of fluid pressures and which may be employed, for instance, in connection with power steering systems, etc. For instance, the apparatus may be used in the steering apparatus disclosed in detail in my copending application upon Power Steering System, Ser. No. 440,993, filed July 2, 1954, now Patent No. 2,896,733.

One of the main objects of my invention is to provide a pressure accumulator having an inner chamber in which there is provided a trapped body of compressible gas in a flexible container for maintaining the accumulated pressure.

Another object is to provide an air valve for inflation passing through an outside chamber, by means of which the flexible container may be inflated, when desired. Still another object is to provide in connection therewith an annular inflatable container for the compressible gas. Again a further object is to provide distributing inlet and outlet chambers having connections to a chamber located around the annular inflatable container. Another object is to provide a removable strainer or strainers in connection therewith, having a baffle separating the inlet chamber from the outlet chamber.

Another object is to provide an apparatus of this character having mounted thereon a number of different valves for controlling the operation of various accessories by means of power, the return of the fluid from which leads to said outside chamber. Another object is to provide a pressure-limiting valve means which may be mounted thereon. Further objects of my invention will appear from the detailed description of the same hereinafter. This application is an improvement over my Patent No. 2,418,667, granted April 8, 1947.

While my invention is capable of embodiment in many different forms, for the purpose of illustration I have shown only certain embodiments of the construction in the accompanying drawings, in which—

Fig. 1 is a diagrammatic representation of an accumulating apparatus made in accordance with my invention, forming part of the power steering system disclosed in my copending application above referred to;

Referring to the drawings, I have shown a diagrammatic representation of the accumulating apparatus in a system such as disclosed in my copending application above referred to. For this purpose I have shown a gear pump 1 having two meshing gears 2 and 3 carried on shafts 4 and 5, respectively, one of which, for instance the shaft 4, may be constantly driven by a pulley or belt (not shown) driven from an internal combustion engine provided for driving a truck. The said gears 2 and 3 are located in a pump housing 8 mounted on the automobile, so as to receive circulating hydraulic liquid of any desired kind from an inlet pipe 9 and discharge the same from an outlet pipe 10. The said liquid, under any desired pressure, is thence delivered by the pipe 10 to an inlet 11 in an unloading valve 12 which is constructed substantially like the unloading valve made in accordance with my invention, as set forth in my Patent No. 2,372,016, upon Unloader Valve, granted March 20, 1945. Connected to the outlet pipe 10 there is, also, a branch pipe 13 having therein a check valve 14 normally pressed into seating position against a valve seat 15 by a helical spring 16, in a chamber 17 which is connected to a main supply or delivery pipe 18. This pipe 18, furthermore, has a branch pipe 19 which leads to an inlet 20 in the lower end of the unloading valve 12 so that when the pressure in the pipe 18 exceeds a certain amount it will operate on the end of a plunger 21 to move the same and thereby quickly open a by-pass valve 22 normally seated on a valve seat 23, in accordance with the further description, hereinafter, of the operation of the by-pass 12, and in accordance with the operation of the unloading valve shown and described in my Patent No. 2,372,016 aforesaid. When this occurs the hydraulic pressure liquid from the pipe 10 is released through a discharge pipe 24 from the unloading valve 12 to be returned to an outer annular heat-equalizing chamber 25 in a pressure accumulator 26 having a normally closed draw-off port 26a for moisture, etc., the said accumulator being described further hereinafter, and thence by the return pipe 9 to the inlet side of the gear pump 1.

The main supply of liquid under pressure is, thus, conveyed at a pressure not exceeding a desired maximum owing to the unloading valve 12, to an inlet port 27 on the accumulator 26.

In accordance with one of the main features of the invention the liquid under pressure is conveyed to an inner chamber 33 defined by a cylinder 28 of porous material, and in which an inflated annulus 34 is also provided for maintaining the accumulated pressure.

The cylinder 28 has a number of peripheral apertures 29, and is divided between its ends into an inlet chamber 30 and an outlet chamber 31 by means of a partition 32. The liquid, thus, has access through the apertures 29 in the walls of the cylindrical chamber 28 to the inner annular chamber 33 containing the inflated annulus of rubber or rubber substitute 34, and which may be inflated to any particular desired pressure, suitable for acting as a compressible accumulator, through an air inlet valve 35 normally seated by a helical spring 36 on a valve seat 37 in a screw-threaded nipple 38, access through which is made available by means of an opening 39 having a screw cap 40 in the outer wall of the pressure accumulator 26, which may be perforated and provided with a packing 40a of any fibrous material which is permeable to gases but sufficiently tight to prevent the passage of liquids, and a perforated retaining disc 40b. In this way the pressure of the hydraulic liquid is maintained in the outlet chamber 31 by means of the compressible inflated annulus 34 so as to be delivered therefrom through an outlet port 41 and thence to a supply pipe 42 having a pressure indicator 43 thereon. This pipe 42 has branches 44 and 45 leading, respectively, to a valve-operating mechanism 46 for controlling the power steering of the vehicle, and to a brake-controlling valve mechanism 47 for operating the brakes by means of power.

The power steering valve mechanism 46, which will hereinafter be described, further, in detail, is comprised, in general, of an inlet 48 for the hydraulic fluid under pressure received from the accumulator 26, which enters a chamber 49 therein, so as to be released, as described, from the said chamber 49 by an outlet port 50 or an outlet port 51 to pipes 52 and 53 leading, respectively, to a power cylinder 54 or a power cylinder 55 of a steering unit 56, which will be described, further, hereinafter. The hydraulic fluid under pressure thus admitted to one or the other of the cylinders 54 and 55 will move one or the other of the pistons 57 and 58 so as to apply power for the rotation of a lever 59 on a fixed pivot 60, having a yoke 61 carrying between its arms a worm gear 62 which is guided in a worm wheel 63 rotatable on a steering column 64 longitudinally movable in the worm 63, provided with a steering wheel 65 thereon, the lower end of which extends into a housing 66 connected to the cylinders 54 and 55 and in which the fixed pivot 60 is located. The steering column 64 has an end of reduced diameter, forming a master cylinder operating rod 67, the rod 67 being arranged to reciprocate with the steering column 64 due to a worm connection 68 formed on the outside of the steering column 64 with which it is connected by an internal worm 68a formed in the worm 63. In this way, by the rotation of the steering wheel 65 an upper master cylinder piston 69 and a lower master cylinder piston 70, fastened to the rod 67, may be raised or lowered between a master cylinder 71 and a master cylinder 72, said cylinders being connected, respectively, by pipes 73 and 74 to inlets 75 and 76 on the steering valve mechanism for the operation of the valves therein alternately and so as to supply power either to the cylinder 54 or the cylinder 55, as desired, in order to aid in the operation of the steering control mechanism, as referred to hereinafter. An outlet opening 77 leads from the steering valve mechanism 46 to a pipe 78 which is connected to a return pipe 79 having an emergency branch connection 80 normally closed by a screw plug 81 to the main hydraulic liquid supply pipe 42. This return pipe 79 is connected by a branch pipe 82 to a check valve 83 having a valve seat 84 on which it is normally pressed into seated position by a helical spring 85. This valve 83, 84 gives access, by means of a pipe 86, to an inlet 87 into the outer return annular chamber 25 located in the pressure accumulator 26. Also, the said branch pipe 79 as a branch connection 88 and another branch connection 89 which lead to outlets 90 and 91, respectively, to carry off any leakage from the valves in the steering control mechanism 46.

Similarly, the return pipe 78 has a connection 92 leading to the upper portion of the brake valve 47 so as to carry off any leakage therefrom, another branch pipe 93 to carry off discharged liquid from the brake valve 47, and still another branch pipe 94 to carry off any leakage from a travel coordination cylinder 95, carrying a travel coordinating plunger 96 which is moved in the operation of the brake valve mechanism 47, as referred to hereinafter. For the purpose of operating the brake valve mechanism 47, there is a manual pressure inlet 97 which is connected by a pipe 98 leading to a manual pressure cylinder or master cylinder 99 having an air bleeder valve 100 of any desired kind therein, and a reaction spring 101 which normally forces upwardly a plunger 102, as referred to further hereinafter, but which has, in general, a plunger rod 103 for operating the same, operated by a treadle 104. It will be understood that as the treadle 104 is depressed, hydraulic power liquid from the brake valve mechanism 47 will be delivered by outlets 105 and 106 to brake lines 107 and 108, respectively, which, respectively, lead to front wheel brake operating cylinders 109 and 110 and rear wheel brake operating cylinders 111 and 112. The pressure exerted on the wheel brakes by means of said cylinders 109, 110, 111 and 112 is, also, coordinated with the movement of the treadle 104 by reason of the fact that the travel coordinating piston 96, which has a seal 113, is moved according to the pressure delivered to the pipes 107 and 108, so as to increase coordinately the volume provided for the manually moved liquid in the pipe 98.

The unloading valve 12 may be constructed as set forth in detail in my Patent No. 2,372,016, as aforesaid, but, as shown in the drawings herein, the said unloading valve 12 may comprise a casing 114 into which the pipe 10 leads by means of the inlet port 11, which communicates with a valve chamber 115 in which the conical valve 22 is contained so as normally to be seated on its valve seat due to the force of a helical spring 116, the lower end of which is received in a cylindrical recess 117 in the upper portion of said valve 22, said spring 116 seating at its upper end against the interior of the casing 114. This end of the spring 116 is, also, located around a guiding stem 118 on a removable plug 119 having a screw-thread 120 thereon. Inside the stem 118 there is a longitudinal recess 121 to receive an upper reduced end 122 of a rod 123 which fits slidably within the interior of the valve 22. The said valve 22, permits the high pressure liquid from the pipe 10 to be released through an outlet opening 124 to the pipe 24 and thence to the return chamber 25 in the accumulator 26. The opening of this valve 22, occurs when the pressure in the pipe 10 becomes greater than the desired maximum and the opening of said valve is accomplished by a snap mechanism, which is shown in detail in the said Patent No. 2,372,016. However, this comprises the plunger 21 hereinabove referred to, communicating with the pipe 19, and which is adapted to move a rod 125, and an adjustable sleeve 126 screw-threaded thereon, against the force of a helical spring 127 in the casing 114. When the rod 125 is moved in this manner it will accumulate an increasing spring pressure against a tapered flange 128 on the other side of a pair of spherical balls 129 and 130 which are held inwardly, normally, by springs 131 and 132 carried in recesses in the casing 114. The tapered flange 128, for this purpose, is carried on a spring shell 133 supporting within the same a helical spring 134, the other end of the spring being held in position by a flanged sleeve 135 resting against a split ring 136 fastened to the rod 125. The spring shell 133, also, rests against another spring shell 137 movable on the rod 125 and retaining therein a helical spring 138 around a flange spring retainer 139 held in fixed position on the rod 125 by a split ring 140. This spring 137 yieldingly resists movement of the tapered projection 138 upwardly from the position shown in Fig. 1 and the spring 134 yieldingly resists the movement of the tapered flange 128 downwardly from above the position of the balls 129 and 130.

The steering control valve mechanism 46 is described specifically in detail in my copending application upon Steering Valve Mechanism, Ser. No. 440,997, filed July 2, 1954. However, as will be seen from the drawings, this mechanism comprises, as above indicated, the inlet ports 75 and 76 for manually supplied hydraulic liquids, which may be supplied, alternately, for instance, from any desired master cylinder for the control of the steering valve mechanism 46. These inlets 75 and 76 communicate, respectively, with valve chambers 141 and 142 so as to operate valve mechanisms 143 and 144 therein, which are constructed the same as each other and only one of which will be described in detail, accordingly. The valve mechanism 143 comprises an outlet valve plunger 145 having a central bore 146 leading to a small valve chamber 147, the lower portion thereof having an inlet opening 148 to receive a valve stem 149 having a spider 150 secured thereto to cooperate with a flange 151 at the lower portion of the outlet valve plunger 145. This spider 150 cooperates with a helical valve-seating spring 152, the upper end of which rests against an internal flange 153 in said plunger 145 so as to provide a valve seat 154 for a conical liquid compensation valve 155 which is arranged to be unseated by the valve rod 149 contacting with the valve casing, in the lowermost position of the valve plunger 145. Said valve plunger 145, furthermore, has peripheral openings 156 to communicate with flutings 156a on a valve plunger 156b, an annular chamber 157 in the valve casing and thence with a passageway 158, passing across the interior of the valve casing of the valve mechanism 46 to the other similarly constructed valve 144 and leading to a vertical passageway 159. The upper end of the vertical passageway 159 leads to the high pressure chamber 49 where it has a valve seat 160 normally closed by a liquid compensating conical check valve 161 pressed against its seat by a helical spring 162 seated on the valve casing beneath the high pressure inlet port 48. Said vertical passageway 159, furthermore, leads to the discharge port 77. The upper end of the valve plunger 145, also, has a valve seat flange 163 to cooperate with a conical outlet valve 164 on a valve stem 165 on the plunger 156b, around which some leakage takes place for compensation through the valve 155. The valve stem 165 passes upwardly through a passageway 166 and has at its upper portion a conical inlet valve 167 cooperating with a valve seat 168 and provided on its upper portion with a spring-retaining cylinder 169 having therein a helical inlet valve-seating spring 170 seated against the interior of the valve casing, and in communication with the discharge pipe 88. This discharge pipe 88, as above referred to, communicates with the discharge pipe 79, which, likewise, leads to the discharge pipe 92 from the brake control valve 47. Also, it will be noted that the high pressure pipe 44 which communicates with the inlet 48 in the steering control valve mechanism 46, is also connected by a pipe 171 to a high pressure inlet port 172 on the brake control valve mechanism 47.

Figure 1:
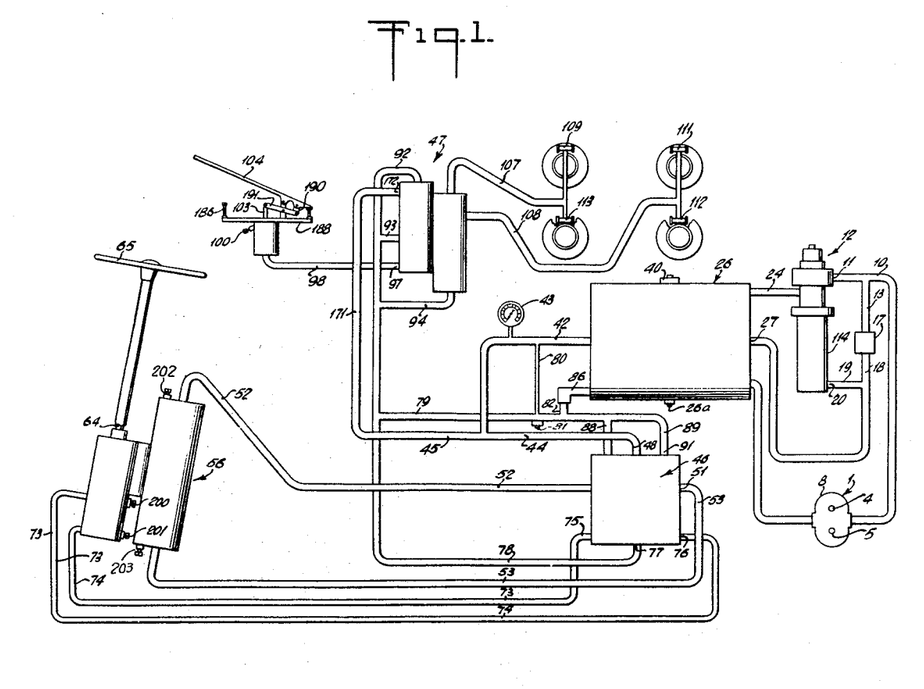
Figure 2A:
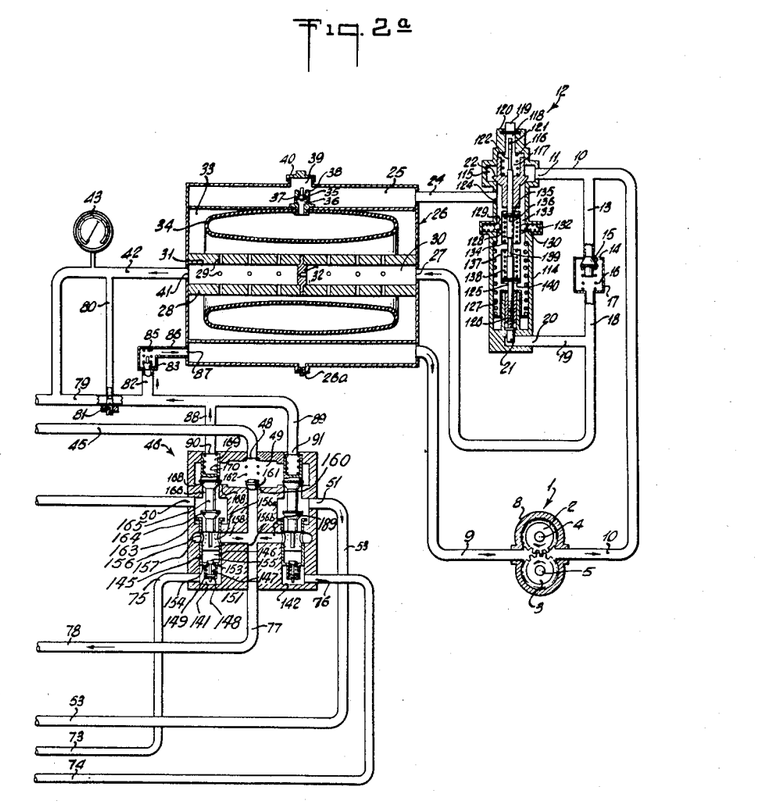
Figs. 2a and 2b together show details of the diagrammatic representation of the said accumulator apparatus in the said system.
Figure 2B:
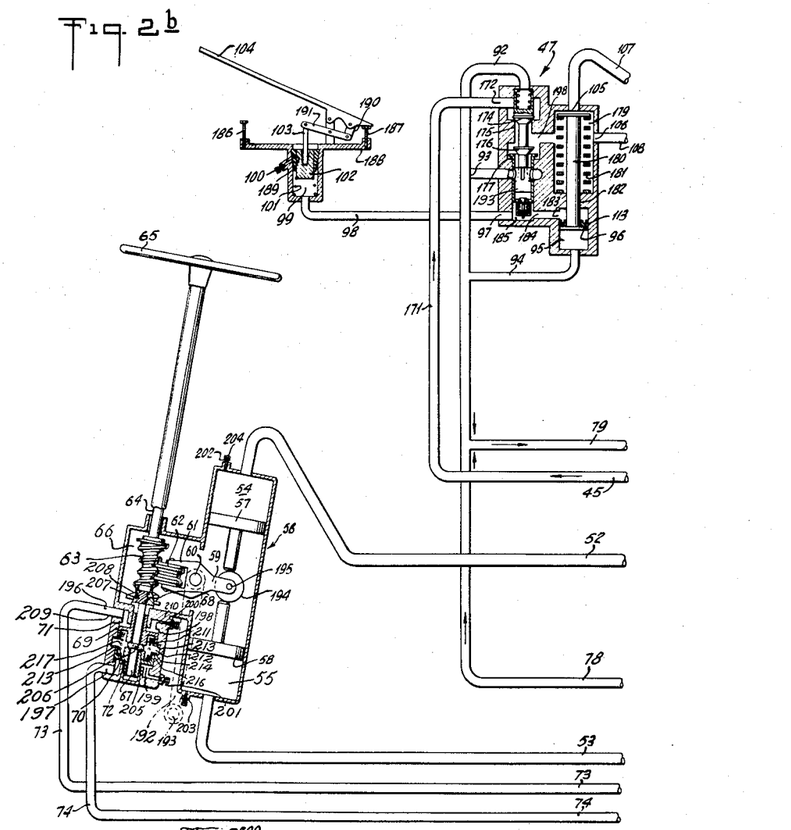
Figure 3:
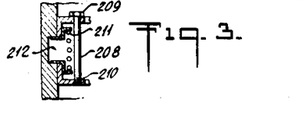
Fig. 3 is a cross-section, enlarged, of a detail of a master cylinder piston.
Figure 4:
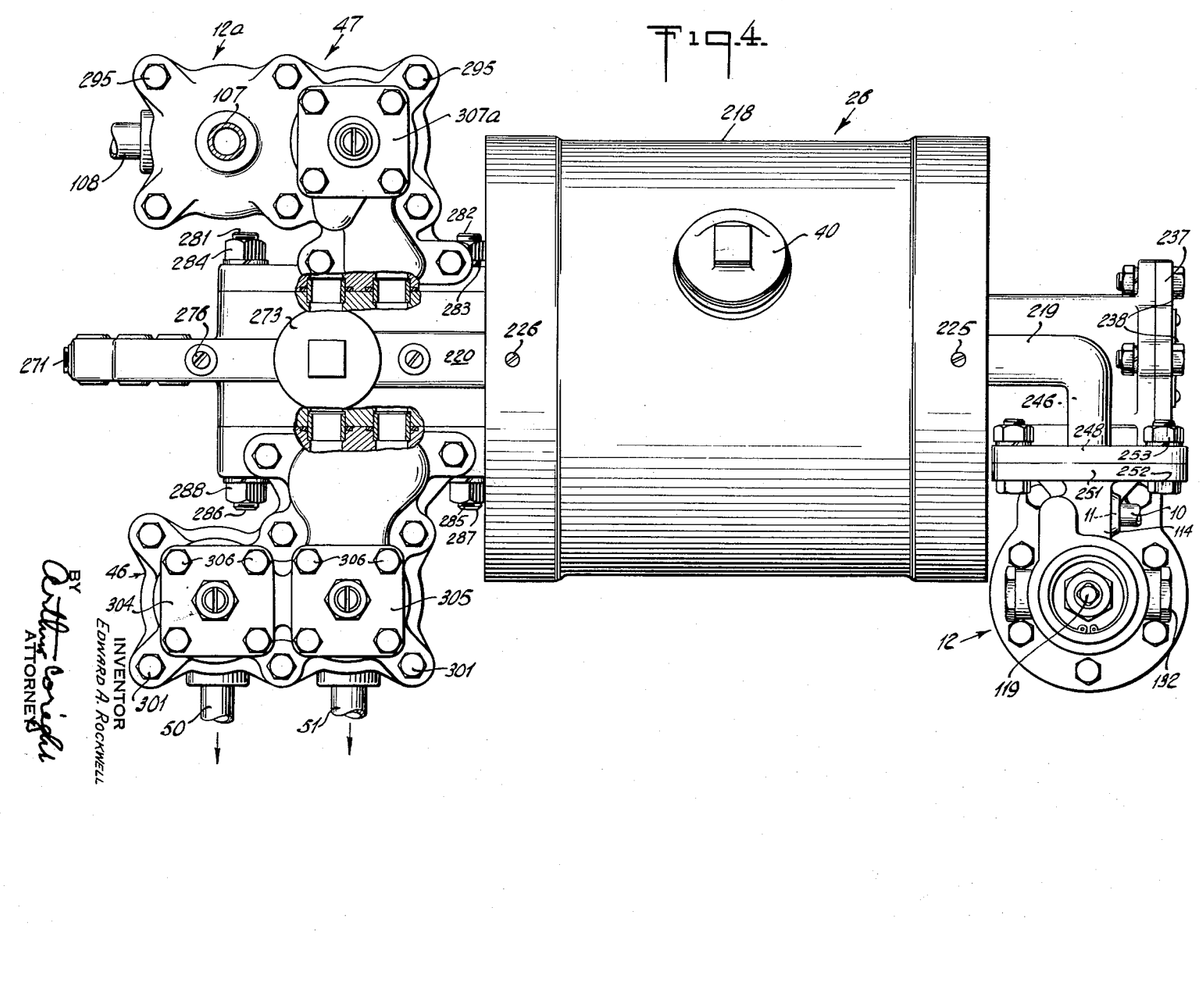
Fig. 4 is a plan view of the accumulator shown in Fig. 1.

The brake control valve mechanism 47 contains therein a valve device 173 which is constructed the same as the valve devices 143 and 144 just described, and which, accordingly, will not be described in detail. Besides, it is to be understood that this valve device 173, as well as the valve devices 143 and 144, may each be constructed in the same manner as set forth in detail in my Patent No. 2,244,966, granted June 10, 1941. This valve mechanism 173, as shown in Fig. 1, may comprise, as in the case of the valve devices 143 and 144, an inlet valve 174, 175 and an outlet valve 176, 177. The inlet valve 174, 175 and the outlet valve 176, 177 communicate with a transverse passageway 178 which leads to a plunger chamber 179 having within the same a plunger 180, normally pressed upwardly by a strong spring 181 and so constructed as to be compressed in accordance with the degree of the hydraulic pressure delivered by the outlet port 105 to the wheel brake cylinders 109, 110, 111 and 112. Furthermore, this plunger 180 extends downwardly through a passageway 182 into a cylinder 183 having threein the piston 96 hereinabove referred to, which is provided for the purpose of coordinating the travel of the treadle 104 with the pressures which are delivered through the outlet port 105 of the wheel brake cylinders 109, 110, 111 and 112. As above stated, this piston 96 has a discharge chamber 95 below the same connected by the pipe 94 to carry off any leakages of liquid to the discharge pipe 92. The cylinder 183 above the piston 96 is connected by a passageway 184 to a plunger chamber 185 for receiving hydraulic liquid under manually applied pressure from the inlet 97 by means of the pipe 98. The portion of this valve mechanism which includes the pressure responsive plunger 180 and the travel coordinating piston 96 is, also, described in detail in my copending application upon Brake Valve Mechanism, Ser. No. 440,995, filed July 2, 1954, now Patent No. 2,896,666. The manual pressure liquid in the pipe 98, and which is supplied by the position of the treadle 104 operating between adjustable stops 186 and 187 in a floor-board plate 188 by the movement of the plunger 102 in the plunger chamber 99 having a peripheral seal 189, is constructed so as to operate a link 190 and lever 191 leading to the plunger 102. The details of the brake treadle mechanism which may be used for this purpose may be constructed in accordance with the subject matter of my copending application upon Brake Pedal Mechanism, Ser. No. 440,996, filed July 2, 1954.

The power steering unit operated by the steering wheel 65 may be constructed as described in my copending application upon Power Steering Unit, Ser. No. 440,999, filed July 2, 1954, now Patent No. 2,896,463, but, as shown in the drawings herein, this as above referred to, may comprise the steering column 64 adapted to be rotated for steering the automobile by means of the steering wheel 65. For this purpose, the steering column 64 passes through the worm wheel 63 which, by the operation of the gear 62 and movement of the bifurcated lever 59 on its pivot 60, rotates a steering arm 192 having a pivotal connection 193 to the steering rod extending across the automobile in the usual way and attached to the pivotal supports of the front wheels of the automobile for guiding the same (not shown). This movement of the steering arm 192 is, furthermore, aided by the application of power to the lever arm 59 by the pistons 57 and 58 which cooperate with a wheel 194 on a pivot 195 on the said arm 59. The power for the movement of these pistons 57 or 58, in one or the other direction as desired, is, as previously indicated, supplied by means of the high pressure liquid delivered by the pipes 52 and 53 from the steering valve mechanism 46. The modulated amounts of this high pressure liquid to accomplish this purpose are determined by the delivery of the master cylinder liquid under the manual pressure, by means of the pipes 73 and 74 which lead, respectively, to ports 196 and 197 on the power steering unit. These ports 196 and 197 communicate, respectively, with an upper master cylinder 198 in which the piston 69 reciprocates and a lower master cylinder 199 in which the lower piston 70 reciprocates. These two chambers may have screw-threaded air bleeder valves 200 and 201, respectively, and the cylinders 54 and 55 may have similar screw-threaded air bleeder valves 202 and 203, respectively. Each of said valves has an internal removable screw 204, in the usual manner, to permit accumulated air to escape, when desired. The two pistons 69 and 70 are located around the longitudinally shiftable stem or rod 67 to which they are fastened by a bearing 205 having ball races 206 and balls 207, and said rod 67 has thereon the external worm gear 68 cooperating with the internal worm gear 68a formed in the lower portion of the worm 63, which is located around the steering column 64. The pistons 69 and 70, furthermore, may be connected together by adjusting screws 208 located in sockets 209 and 210, respectively. It will be noted, furthermore, that the pistons 69 and 70, respectively are yieldably supported with regard to a central chamber 211 extending into a peripheral recess 212. Furthermore, the two plungers 69 and 70 are pressed apart outwardly to the limits of their positions, as determined by the said screws 208 which are adjacent to two spring-retaining rings 213 and 214, the outer edges of which are limited in their inward movement by shoulders 215 and 216 extending into the peripheral recess 212 inside the casing, a helical spring 217 being located between the rings 213 and 214 for this purpose. In this way, by the rotation of the steering wheel 65 the rod 67 may be forced downwardly or upwardly by the worms 68 and 68a so as to move the pistons 69 and 70 upwardly or downwardly and, thus, deliver manual pressure liquid through to one or the other of the pipes 73, 74 for the operation of the valves 143 and 144 to deliver the pressure liquid to the power cylinders 54 or 55, thus aiding the rotation of the steering wheel 65, as desired.

Figure 5:
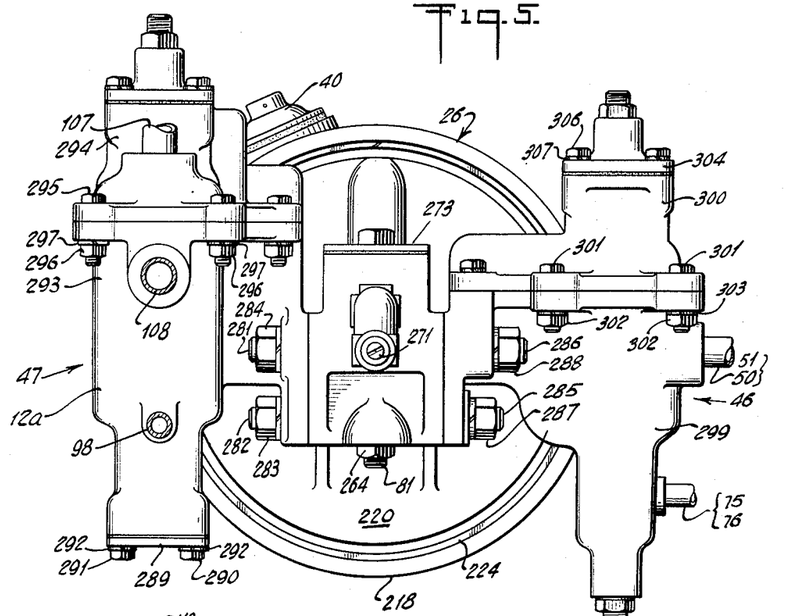
Fig. 5 is an end elevation showing one end of the said accumulator.
Figure 6:
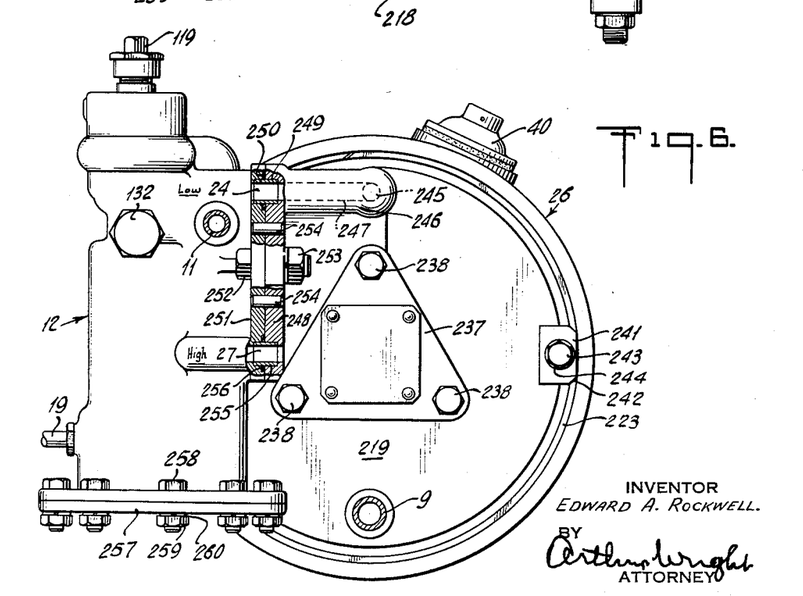
Fig. 6 is an elevation of the other end of said accumulator.
Figure 7:
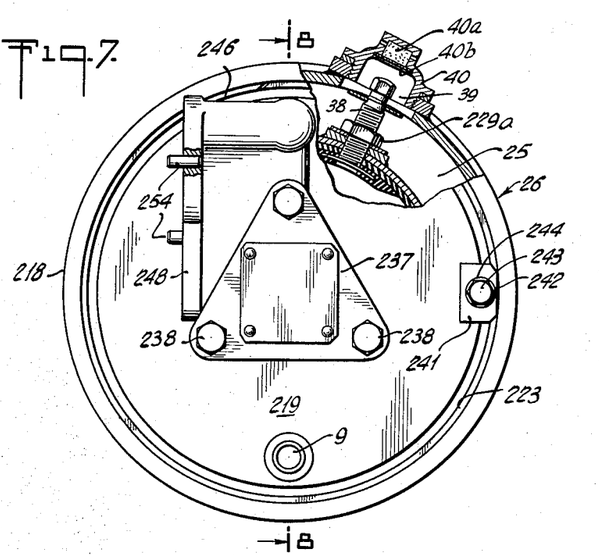
Fig. 7 is an elevation of the said accumulator, partly in section.
Figure 8:
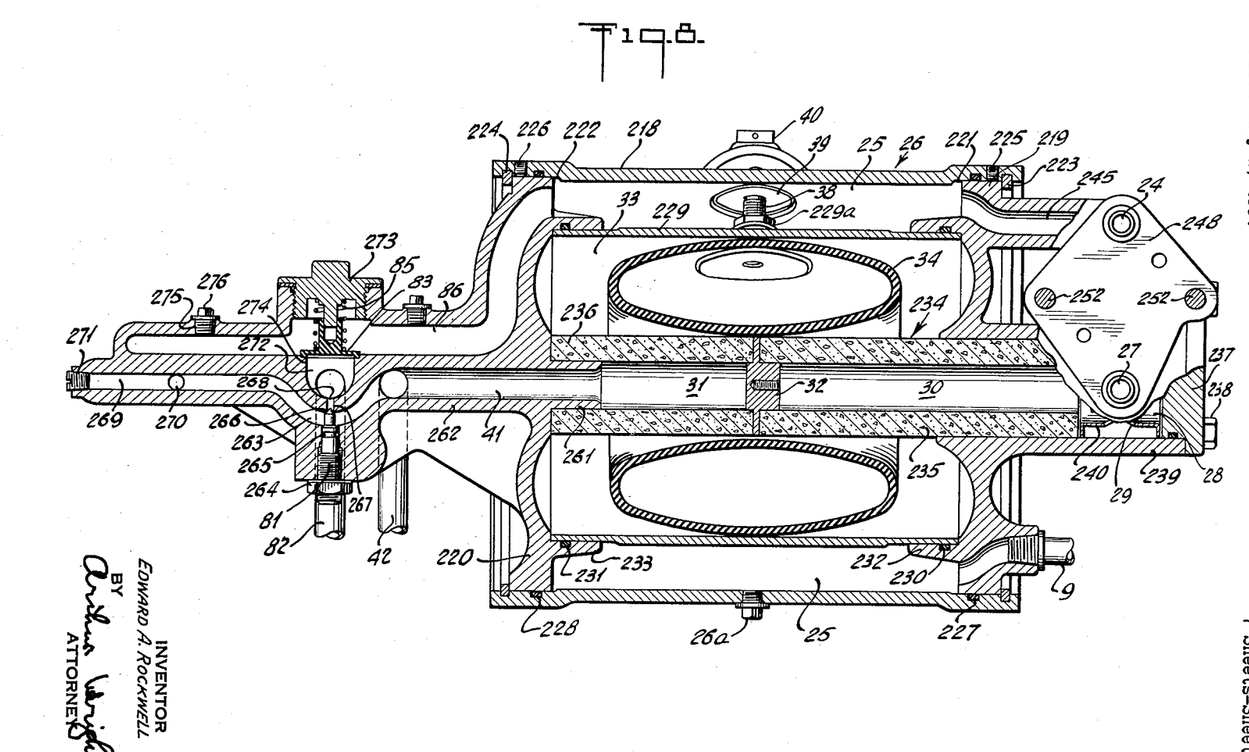
Fig. 8 is a vertical section of the said accumulator taken on line 8—8 of Fig. 7.
Figure 9:
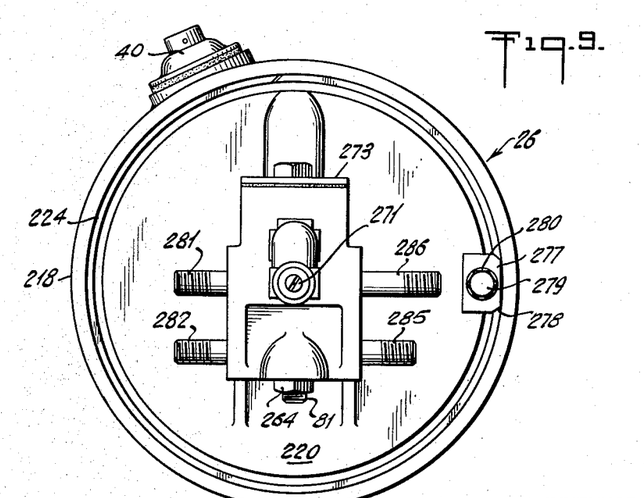
Fig. 9 is an end elevation showing the main body of said accumulator with some of the parts removed.

As shown in Figs. 4 to 9, the accumulator may be constructed with connections such as to provide a compact apparatus which will be more readily capable of installation wherever desired, and so as to eliminate lag in the receipt or delivery of the pressure fluids to and from the accumulator. For this purpose the accumulator 26 may be comprised of an outer cylinder 218 having heads 219 and 220 which are held in grooves 221 and 222, respectively, by means of split rings 223 and 224 and locking screws 225 and 226. The said heads 219, 220 are provided with annular rubber, or rubber substitute, seals 227 and 228. These heads 219, 220 hold in central position within the cylinder 218 an inner cylinder 229 having the valve inflation nozzle 38, like a tire valved inflation nozzle, provided with a screw-thread, carrying a nut 229a, for attachment of a compressed air pipe for the inflation of the annular, flexible, expansible and contractible container or bag 34. Rubber, or rubber substitute, seals 230 and 231 seal the cylinder 229 within internal flanges 232 and 233 located on the heads 219 and 220. The said heads 219 and 220 also hold in place a central cylinder 34 constructed like the cylinder 28 previously referred to, except that in this instance the said cylinder is in two parts 235 and 236, made of any rigid material permeable to liquid, as for instance any porous unglazed baked clay material. These two cylinders 235, 236 may be separated by an impermeable baffle or partition, such as the partition 32 previously described. The head 219, furthermore, has an end closure 237 secured by screws 238 on an extension 239 of said head. The cylinder 235 is held in place by a perforated U-shaped ring 240 which spaces the same away from the head 219. It will be noted, also, that the head 219 is held in its correct radial position with regard to the cylinder 218, by a clamping lug 241 which enters a recess 242 on said cylinder 218, and is tightly secured by means of a screw 243 and a lock washer 244. Also, the head 219 has a longitudinal low pressure passageway 245 connecting with the outer chamber 25 and an extension 246 having therein a passageway 247 which communicates with the passageway 245. This passageway 247 leads to the low pressure port 24 in a supporting flange 248 formed on the head 219, having a sealing sleeve 249 and an annular rubber, or rubber substitute, seal 250 passing into a supporting flange 251 formed on the unloading valve chamber 12. The flanges 248 and 251 are connected together by screws 252, having nuts 253, and are centered by means of pins 254. Also passing through the flanges 248 and 251 there is the high pressure port 27 which has therein a sealing sleeve 255 having around the same an annular seal 256 of rubber or a rubber substitute, which conveys to the central passageway 30 the high pressure liquid from the pump discharge pipe 10 and its connecting pipes 13 and 18. As shown in Fig. 6, the lower portion of the unloading valve casing 12 may be closed by an end plate 257, having bolts 258 with nuts 259 and lock washers 260 thereon.

The head 220 at the other end of the accumulating apparatus has an internal annular projection 261 for holding in place the cylinder 236. This annular projection 261 communicates with the passageway 41, in an extension 262, which has a connection to the pipe 42. In the said passageway 41, within the projection 261, there is a downwardly curved passageway 263 which has therein the valve screw 81 held in place by a nut 264 and provided with an annular rubber, or rubber substitute, seal 265. The said valve screw 81 also has a conical valve member 266 at its end cooperating with a valve seat 267 in a short passageway 268 located in the downwardly curved passageway 263, and connected to the passageway 263 there is a passageway 269 having a port 270 connected at the gauge 43 and a plug 271 in the end of the passageway 269. The short passageway 268 normally closed by the valve 266, 267, communicates with a recess 272 which has a connection to the pipe 82 and which communicates with the check valve 83 seated by the spring 85 supported from a screw plug 273 so as, normally, to seat on a valve seat 274 in the extension 262 leading to the low pressure passageway 86 and thence to the low pressure chamber 25. There is, also, in the passageway 86 a port 275, normally closed by a plug 276, for connection to a gauge (not shown) when desired. The head 220 is also located in the correct radial position, by means of a clamping lug 277, held in a recess 278 in the cylinder 218 by means of a screw 279 and a split lock washer 280. Furthermore, on the said head, on the extension 262, there are provided screws 281 and 282 for attachment thereto of a brake valve casing 12a by means of nuts 283 and 284 and screws 285 and 286 for attachment thereto, and the two pairs of steering valves 46, by means of nuts 287 and 288. The brake valve 47 has a bottom plate 289 closing the same, held in place by screws 290 and 291 provided with lock washers 292. Also, a main valve casing 293 and an upper valve casing 294 are connected together by bolts 295 having nuts 296 and lock washers 297. As shown in Fig. 5, the main valve casing 293 has therein the inlet port 98 for manually controlled liquid and has, also, the port 108 for connection with the rear wheel brakes to be controlled by the said valve 12 and may, furthermore, be provided with the outlet pipe 107 for connection with the front wheel brakes. As above indicated, the two pairs of steering valves 46 are constructed substantially alike. They are provided with a single main valve casing 299 and a single upper valve casing 300 connected thereto by screws 301, nuts 302 and lock washers 303, and the said pairs of valves are provided with upper closures 304 and 305 respectively, by means of screws 306 and lock washers 307. The brake valve casing has a similar closure 307a. The said main valve casing 299 has the ports 50 and 51 for communicating the high pressure liquid to the starting motor 56 as well as the two inlet ports 75 and 76 for communication with the master cylinder controlled by the movement of the steering column 65.

In the operation of my invention, whenever the vehicle is being operated to steer the same, the steering wheel 65 will be rotated in the direction desired. This will result in the liquid being forced to one or the other of the master cylinder pipes 73, 74 so as to operate one or the other of the valves 143 and 144, thus admitting pressure liquid to one of the inlet valves 167, 168 after closing the corresponding outlet valve 163, 164. This will supply the pressure liquid derived from the gear pump 1, the maximum available pressure of which is determined by the unloading valve 12, and which is maintained at a uniform pressure by the accumulator 26.

This pressure will accumulate by passing into the passageway 30 and thence through the perforations 29 or through the porous material 235 into the inner chamber 33 around the compressible annular container 34 containing air or any other gas which has been introduced through the nozzle 38 at any desired pressure. The container 34 will be compressed by the liquid in the surrounding chamber 33 to the extent permitted by the pressure of the surrounding liquid and will thence be expelled through the apertures 29 or the porous cylinder 236 to the outlet chamber 31 and from there into the system to operate the various pairs of self-lapping valves for the control of the accessories to which they are connected. The pressure in the accumulator 226 will, of course, be regulated according to the operation of the unloading valve 12, which is subjected to the line pressures through the pipe 19. The location of the low pressure chamber 25 outside the inner high pressure chamber 33 will tend to equalize the temperatures present in the chamber 33 produced by the expansion and contraction of the flexible compressible container 34. However, the arrangement is such as to enable the flexible container 34 to be inflated readily by the removal of the cap 40, which latter, when in place, also permits the very gradual escape of any accumulated air through the porous material 40a therein. Also, it will be noted that the cylinders 235 and 236 act as strainers, which are also removable and replaceable to prevent extraneous solid materials reaching the flexible container 34. This arrangement is facilitated, also, by reason of the removable baffle 32 between the cylinders 235 and 236.

This delivered pressure liquid from the accumulator 26 will be received in one or the other of the cylinders 54 and 55 so as to move the steering arm 192. The steering of the vehicle in the opposite direction will be accomplished in the same, but reverse, manner by moving the steering wheel in the opposite direction, thus supplying the pressure liquid to the other one of the cylinders 54, 55 while simultaneously releasing the pressure liquid from the other one of said cylinders by the closing of the appropriate inlet valve 167, 168 and the opening of the corresponding outlet valve 163, 164. The discharged liquid will pass out by the pipe 77 to the pipe 79 through the check valve 83, 84, thence to the annular chamber 25 and back to the inlet side 9 of the gear pump 1.

The control of the brakes will take place in a similar manner, and which is operable in a similar way from the same power source, in an advantageous manner, inasmuch as, generally, only one or the other thereof is being operated at a given time. In this instance the downward movement of the treadle 104 will move the plunger 102 to supply manual pressure liquid through the pipe 98 to the chamber 185 so as to close the outlet valve 176, 177, followed by the opening of the inlet valve 174, 175 which admits pressure liquid from the pipe 171 to be supplied by the passage 178 to the pressure chamber 179 and by the pipes 107 and 108 to the front and rear wheel brake cylinders 109, 110, 111 and 112. This increase of pressure in the chamber 179 will cause the travel-coordinating piston 96 to move downwardly, thus increasing the volume in the chamber 183 and requiring the treadle 104 to have a travel which is coordinate with the pressure in the pressure chamber 179 which delivers the pressure liquid to the wheel brakes. Any leakage from the travel piston 96 or from the valves 173, 143 and 144 will be carried off by the discharge pipes connected thereto through the inlet side 9 to the gear pump 1. Also, it will be noted that in the retracted positions of the valves 173, 143 and 144 the liquid compensating valves 154, 155 in the lower portions thereof will be opened by contact of the valve stems 149 thereof with the respective valve casings, thus opening the compensating valves to admit or discharge any required equalizing amounts of the liquid in the system.

While I have described my invention above in detail I wish it to be understood that many changes may be made therein without departing from the spirit of the same.

I claim:

1. An accumulator comprising, in combination, a rigid housing defining an enclosed pressure accumulating chamber, a member permeable to fluid mounted in said housing within said chamber and defining an inlet chamber, means included in said housing providing for fluid communication to said inlet chamber, means included in the housing providing an outlet for fluid in said pressure accumulating chamber, and an annular container of elastic material mounted in said housing to encircle said hollow member, said container having a compressible gas therein.

2. An accumulator comprising, in combination, a rigid housing defining an enclosed pressure accumulating chamber, means included in the housing providing an inlet to admit fluid to said pressure accumulating chamber, a member permeable to fluid mounted in said housing within said chamber and defining an outlet chamber, means included in said housing providing for fluid communication to said outlet chamber, and an annular container of elastic material mounted in said housing to encircle said member, said container having a compressible gas therein.

3. An accumulator comprising, in combination, a rigid housing defining an enclosed pressure accumulating chamber, a hollow member permeable to fluid mounted in said housing within said chamber and defining an inlet chamber and an outlet chamber, means included in said housing providing for fluid communication to said inlet and said outlet chambers, and an annular container of elastic material mounted within said housing in said pressure accumulating chamber to encircle said hollow member, said container having a compressible gas therein.

4. An accumulator comprising, in combination, a rigid housing defining an enclosed pressure accumulating chamber, a hollow member permeable to fluid mounted in said housing within said chamber and defining an inlet chamber and an outlet chamber, means including a manifold carried by said housing and a plurality of passages connecting said manifold to said hollow member providing for fluid communication to said inlet and said outlet chambers, and an annular container of elastic material mounted within said housing in said pressure accumulating chamber to encircle said hollow member, said container having a compressible gas therein.

5. An accumulator comprising, in combination, a rigid housing defining an enclosed pressure accumulating chamber and having a double walled section at least partially surrounding said chamber, said housing defining a low pressure chamber between the walls of said section for equalizing the temperature in said pressure accumulating chamber, a hollow member permeable to fluid mounted in said housing within said pressure accumulating chamber and defining an inlet chamber and an outlet chamber, means included in said housing providing for fluid communication to said inlet and said outlet chambers, and an annular container of elastic material mounted within said housing in said pressure accumulating chamber to encircle said hollow member, said container having a compressible gas therein.

6. An accumulator comprising, in combination, a rigid housing defining an enclosed pressure accumulating chamber, a hollow member permeable to fluid mounted in said housing to extend longitudinally of said chamber and defining an inlet chamber and an outlet chamber, an impermeable member arranged between said inlet and outlet chambers to separate the latter, means included in said housing providing for fluid communication to said inlet and said outlet chambers, and an annular container of elastic material mounted within said housing in said pressure accumulating chamber to encircle said hollow member, said container having a compressible gas therein.

7. An accumulator comprising in combination, a housing defining an enclosed pressure accumulating chamber, an annular container of flexible material mounted within said housing in said pressure accumulating chamber and having therein a compressible gas, a hollow member permeable to liquid mounted in said housing coaxially of said annular container and forming an inlet chamber for fluid supplied to said pressure accumulating chamber and an outlet chamber, the wall of said hollow member separating said inlet and outlet chambers from said pressure accumulating chamber, impermeable means carried by said hollow member separating said inlet and outlet chambers, and a manifold on the accumulator housing having a plurality of passages connected to said outlet chamber.

8. An accumulator, comprising, in combination, a housing defining a pressure accumulating chamber, an annular container of flexible material mounted within said housing in said pressure accumulating chamber and having therein a compressible gas, a hollow member permeable to liquid mounted in said housing so that said annular container encircles said member and forming an inlet chamber for fluid supplied to said pressure accumulating chamber and an outlet chamber therefor, impermeable means included in said hollow member to separate said inlet and outlet chambers, the wall of said hollow member separating said inlet and outlet chambers from said pressure accumulating chamber, and means in said housing defining a low pressure chamber at least partially surrounding the pressure accumulating chamber for temperature equalization.

9. An accumulator, comprising in combination, means defining an enclosed pressure accumulating chamber having rigid walls, an annular flexible container having therein a compressible gas mounted within said chamber, a hollow member of material permeable to liquid forming an inlet chamber for fluid supplied to said pressure accumulating chamber and mounted in said pressure accumulating chamber so that said annular container encircles said hollow member with the wall thereof of permeable material separating said inlet chamber from said pressure accumulating chamber, and a member of material permeable to liquid mounted so as to form an outlet chamber separate from said inlet chamber and accessible to the pressure accumulating chamber.

10. An accumulator, comprising in combination, a rigid housing defining an enclosed pressure accumulating chamber, an annular flexible container having therein a compressible gas mounted in said housing within said chamber; means defining an inlet chamber for fluid supplied to said pressure accumulating chamber and an outlet chamber communicating with the pressure accumulating chamber, means included in said housing defining a walled outer chamber at least partially surrounding the pressure accumulating chamber for temperature equalization; and an inflation nozzle mounted on said flexible container and extending from said pressure accumulating chamber through one wall of said outer chamber so that access is provided thereto through said outer chamber.

11. An accumulator comprising, in combination, a rigid housing defining an enclosed pressure accumulating chamber, a member permeable to fluid mounted in said housing within said pressure accumulating chamber and defining an inlet chamber and an outlet chamber, impermeable means included in said member to separate said inlet and outlet chambers, means included in said housing providing for fluid communication to said inlet and said outlet chambers, and a container of elastic material mounted in said housing within said pressure accumulating chamber, said container having a compressible gas therein.

12. An accumulator, comprising in combination, a housing, an annular flexible container mounted in said housing and having therein a compressible gas, means in said housing defining a pressure accumulating chamber for fluid, said chamber being accessible to the outside of said container, a member of permeable material mounted in said housing and forming an inlet chamber for fluid supplied to said pressure accumulating chamber, a member of permeable material mounted in said housing and forming an outlet chamber accessible to the pressure accumulating chamber, non-permeable means separating said members and said inlet and outlet chambers, and means in said housing defining a chamber surrounding the pressure accumulating chamber for temperature equalization.

13. An accumulator, comprising in combination, a housing, an annular flexible container mounted in said housing and having therein a compressible gas, means in said housing defining a pressure accumulating chamber for fluid, said chamber being accessible to the outside of said container, a member of permeable material mounted in said housing in the opening in the center of said annular container and forming an inlet chamber for fluid supplied to said pressure accumulating chamber, a member of permeable material mounted in said housing axially of the other member and forming an outlet chamber accessible to the pressure accumulating chamber, means separating said inlet and outlet chambers, and means in said housing defining a chamber surrounding the pressure accumulating chamber for temperature equalization.

14. An accumulator, comprising in combination, a housing, means in said housing defining a pressure accumulating chamber for fluid, an annular container of flexible material mounted in said housing within said chamber, said container having therein a compressible gas, a cylindrical member of permeable material mounted in said housing in the opening in the center of said annular container and forming an inlet chamber for fluid, a cylindrical member of permeable material mounted in said housing axially of said first cylindrical permeable member and forming an outlet chamber communicating with the pressure accumulating chamber, non-permeable means between said members and separating said inlet and outlet chambers, means in said housing providing an outer chamber surrounding the pressure accumulating chamber for temperature equalization, and an inflation nozzle for said flexible container passing through the outer chamber.

15. An accumulator, comprising in combination, a housing, means in said housing defining a pressure accumulating chamber for fluid, an annular container of flexible material mounted in said housing within said chamber, said container having therein a compressible gas, means in said housing defining an inlet chamber for fluid supplied to said pressure accumulating chamber and an outlet chamber communicating with the pressure accumulating chamber, a valve manifold mounted on the accumulator housing having a plurality of connections connected to said outlet chamber, means in said housing defining an outer chamber surrounding the pressure accumulating chamber, and an inflation nozzle for said flexible container passing through the outer chamber.

16. An accumulator, comprising in combination, a housing, means in said housing defining a pressure accumulating chamber, an annular container of flexible material mounted in said housing within said chamber, said container having therein a compressible gas, a member of permeable material mounted in said housing and forming an inlet chamber for fluid supplied to said pressure accumulating chamber, means in said housing defining an outlet chamber communicating with the pressure accumulating chamber, means separating said inlet and outlet chambers, a valve manifold on the accumulator housing having a plurality of connections connected to said outlet chamber, means in said housing defining an outer chamber surrounding the pressure accumulating chamber, and an inflation nozzle for said flexible container passing through the outer chamber.

17. An accumulator, comprising in combination, a housing, means in said housing defining a pressure accumulating chamber for fluid, an annular container of flexible material mounted in said housing within said pressure accumulating chamber, said container having therein a compressible gas, a cylindrical member of permeable material mounted within said housing inside the center opening in said annular container and forming an inlet chamber for fluid supplied to said pressure accumulating chamber, said permeable material separating said inlet chamber from said pressure accumulating chamber, a second cylindrical member of permeable material forming an outlet chamber communicating with the pressure accumulating chamber, said permeable material separating said outlet chamber from said pressure accumulating chamber, non-permeable means separating said inlet from said outlet chamber, a valve manifold on the accumulator housing having a plurality of connections connected to said outlet chamber, means in said housing defining an outer chamber surrounding the pressure accumulating chamber, and an inflation nozzle for said flexible container passing through the outer chamber.

18. An accumulator, comprising in combination, a housing defining a pressure accumulating chamber for fluid, an annular container of flexible material mounted in said housing within said chamber and having therein a compressible gas, means in said housing defining an inlet chamber for fluid, means providing fluid communication between said inlet chamber and said pressure accumulating chamber, means in said housing defining an outlet chamber in communication with the pressure accumulating chamber and separated from the inlet chamber, and means in said housing providing an outer chamber surrounding the pressure accumulating chamber and the container within the same for temperature equalization.

19. An accumulator, comprising in combination, a housing, an annular flexible container mounted in said housing and having therein a compressible gas, means in said housing defining a pressure accumulating chamber for fluid, means in said housing defining an inlet chamber for fluid, means providing fluid communication between said chambers, a fluid pressure unloading valve mounted on the accumulator housing and connected by an inlet conduit to the said inlet chamber, means defining an outlet chamber communicating with the pressure accumulating chamber and separated from the inlet chamber, and a manifold on the accumulator housing having a plurality of passages connected to said outlet chamber.

References Cited in the file of this patent

UNITED STATES PATENTS

| | | |
|---|---|---|
| 2,009,433 | Carroll | July 30, 1935 |
| 2,261,948 | Beach | Nov. 11, 1941 |
| 2,351,761 | Hanna | June 20, 1944 |
| 2,592,221 | Whitted | Apr. 8, 1952 |
| 2,609,001 | Hebard | Sept. 2, 1952 |
| 2,630,834 | Weber et al. | Mar. 10, 1953 |
| 2,659,391 | Berger | Nov. 17, 1953 |
| 2,676,605 | Meredew | Apr. 27, 1954 |
| 2,771,270 | Selberg | Nov. 20, 1956 |

FOREIGN PATENTS

| | | |
|---|---|---|
| 558,021 | Germany | June 10, 1933 |